United States Patent [19]

Paola

[11] 3,859,956

[45] Jan. 14, 1975

[54] MULTIWORKPIECE CONDENSATION COATING APPARATUS

[75] Inventor: Carl Ralph Paola, Westfield, N.J.

[73] Assignee: Bell Telephone Laboratories, Incorporated, Berkeley Heights, N.J.

[22] Filed: Jan. 10, 1974

[21] Appl. No.: 432,150

[52] U.S. Cl. .................................. 118/49.1, 118/500
[51] Int. Cl. .............................................. C23c 13/08
[58] Field of Search ................................ 118/48–49.1, 118/500–503; 117/106–107.3

[56] References Cited

UNITED STATES PATENTS

| | | | |
|---|---|---|---|
| 2,912,351 | 11/1959 | Danner et al. | 117/107.1 X |
| 3,396,696 | 8/1968 | Becker | 118/49 |

*Primary Examiner*—Morris Kaplan
*Attorney, Agent, or Firm*—A. N. Friedman

[57] ABSTRACT

The disclosed apparatus permits the successive condensation coating of both sides of several substrate wafers from the vapor phase without intermediate manipulation of each wafer. Each wafer holder is pivotally mounted in a main frame in a state of unbalance. After the coating of one side of each wafer, the main frame is rotated to a second position so as to expose the other side of each wafer to the vapor source. The main frame is supplied with stops to limit the motion of each wafer holder such that in either position of the main frame, each wafer is held perpendicular to the incident vapor flux. This tends to minimize shadowing produced by nonperpendicular incidence of the vapor flux through an aperture mask and to enhance coating uniformity across each substrate wafer.

8 Claims, 4 Drawing Figures

PATENTED JAN 1 4 1975 3,859,956

MULTIWORKPIECE CONDENSATION COATING APPARATUS

BACKGROUND OF THE INVENTION

1. Field of the Invention

The invention lies in the field of vacuum deposition of thin films.

2. A Brief Description of the Prior Art

The simultaneous vacuum vapor coating of several substrates, intended for solid state electronic use, presents several problems which are more or less severe depending on the required tolerances. As a first consideration, it is usually desirable to maximize the uniformity of the coating across the substrate. Also, where aperture masks are used to define a thin film pattern on the substrate, the shadowing of the substrate by the finite thickness of the mask can be significant for high vacuum processes such as evaporation coating and ion beam sputtering. This is especially true as increased miniaturization of electronic elements requires that critical dimensions of the desired pattern become as small as the thickness of the mask material. When free standing metal aperture masks are used this effect is often accentuated by small separations of the mask from the surface to be coated. The shadowing effect is minimum when the vapor flux is incident perpendicular to the masked surface, increasing as the angle of incidence deviates from perpendicularity.

If several substrate wafers are to be simultaneously coated, with a view to maximize perpendicular vapor flux incidence, consideration must be given to the nature of the vapor source. In important vapor coating processes such as evaporation coating and ion beam sputtering, the vapor flux is emitted radially from a source which is small compared to the distance from the source to the substrate wafers. If the substrates are arranged in a plane only one substrate can have a point of perpendicular incidence, the others experiencing more nonuniformity and shadowing as their distance from this point increases. This problem is well recognized in the art and prior workers have utilized such devices as arranging the substrates around a hemispherical shell whose center is near the position of the vapor source. Others have approximated this hemispherical shell solution with a series of flat frames each tangent, near its center, to a common sphere (*Vacuum Deposition of Thin Films*, Holland, John Wiley & Sons, Inc., New York, 1961 pages 300–302). The magnitudes of these nonuniformities can be calculated using well known principles (ibid. pages 141–167).

The problems presented above become compounded, however, when it is desired to coat both sides of the substrate wafer without removing them from their vacuum environment. The segmented flat frames just referred to are, at best, a compromise with most of the substrate wafers experiencing nonperpendicular incidence. If each of the flat frames segments is turned over in the vacuum station, as is done in one currently used apparatus, this compromise situation is preserved. The hemispherical shell, on the other hand, is a good solution to this problem only for one side deposition.

SUMMARY OF THE INVENTION

A simple holder has been developed which permits the condensation coating of both sides (successively) of several substrate wafers from the vapor phase, while maintaining them in a vacuum between coatings. During the coating of either side, each wafer is held perpendicular to the incident vapor flux. This is accomplished by mounting each wafer in a holder which is freely pivoted in a planar main frame in an unbalanced fashion. The motion of each holder is limited by stops fixed in the main frame and positioned to produce a perpendicular incidence in either of two fixed positions of the main frame. This provision of perpendicular incidence on the both sides of each substrate maximizes the uniformity of the coating across each substrate and minimizes shadowing effects which would be produced by nonperpendicular incidence of the vapor flux through an aperture mask.

DETAILED DESCRIPTION OF THE INVENTION

The workholder described below holds several substrate wafers for simultaneous condensation coating. There are provisions for rotating the workholder to expose the other side of each substrate wafer to the vapor source for coating. The thickness of a coating deposited on a plane surface from a small radially emitting source decreases with the distance from the point on the plane closest to the source. This is due to two simple geometric facts. As one moves away from the position of closest proximity the solid angle subtended by a given substrate area decreases and the solid angle subtended by the vapor source, when viewed from the substrate area decreases. When coating thickness uniformity is of particular importance to the contemplated use, this would suggest the desirability of maintaining all coating surfaces as near to perpendicular incidence as possible.

The condition of perpendicular incidence is also desirable when a thin film pattern is to be produced by vapor coating of the substrate wafer through an aperture mask. Aperture masks can be produced directly on the substrate wafer by such methods as photolithographic processing. Alternately, separate free standing metal masks can be used. Perpendicular incidence is particularly desirable, in conjunction with aperture masks, when critical dimensions of the desired pattern are nearly as small as the thickness of the mask material. This criticality can be accentuated, in the case of metal masks, by the fact that it is common to have small separations of the metal mask from the surface being deposited.

Figure 1:
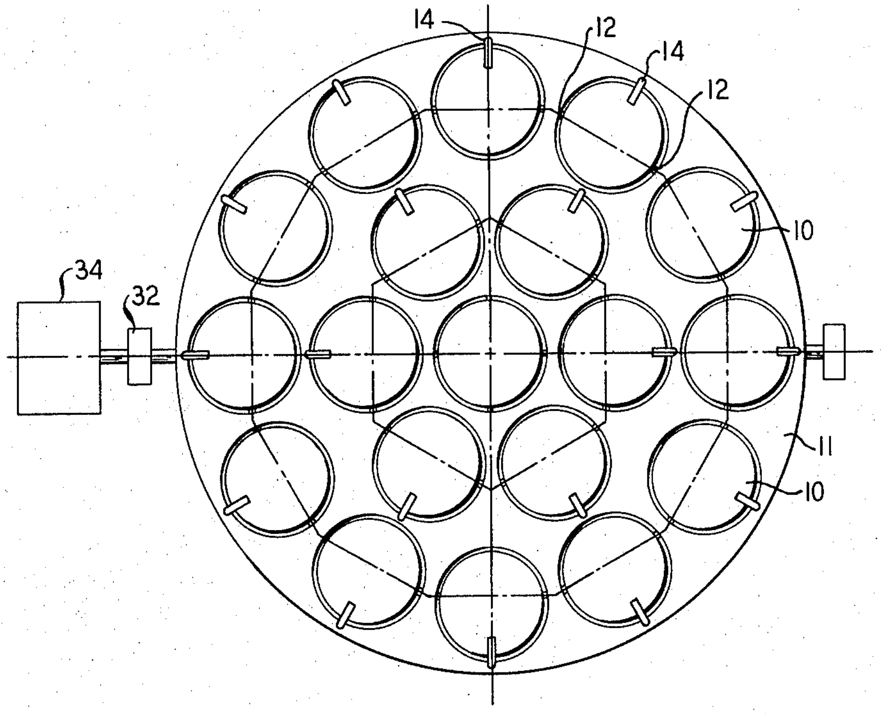
FIG. 1 is a plan view of a planar main frame with provisions for the mounting of nineteen substrate wafers.

FIG. 1 shows a top view of a workholder constructed in accordance with the invention. In this workholder 19 substrate wafers 10 are held in a planar main frame 11. The substrates 10 are mounted in holders which are freely pivoted about pivots 12 which define an axis slightly displaced from the center of the substrates 10. In use, the main frame 11 is held in a horizontal position and the motion of the substrates 10 is limited by the stops 14.

Figure 2:
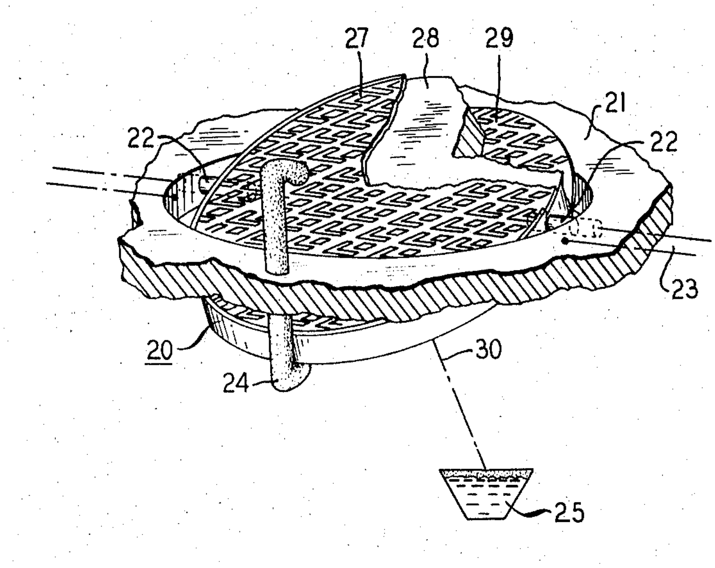
FIG. 2 is a perspective view of a single wafer holder pivotally mounted in the main frame.

FIG. 2 shows a portion of the main frame 21 in which a single substrate holder 20 is held by pivots 22. The motion of the substrate holder is limited by stop 24 such that the plane of the substrate holder 20 is perpendicular to a line from the holder 20 to the vapor source 25. The holder 20 holds a substrate 28 with aperture masks 27 and 29 covering either face. As shown, the apparatus is in position for vapor coating through mask 29. When the main frame 21 is turned over to its second vapor coating position the motion of the substrate holder will be limited by stop 26 such that mask 27 is exposed to the vapor source in an orientation perpendicular to a line to the vapor source 25. As shown the substrate holder 20 is unbalanced by the displacement of the pivots 22 from the center line 23 of the holder. However this can be accomplished by other means, such as incorporation of an unbalanced weight in the holder 20. While the apparatus of FIGS. 1 and 2 requires a 180° rotation of the main frame to expose the other side of the workpieces to the vapor flux, other geometries can be contemplated which would require other angular displacements.

Figure 3:
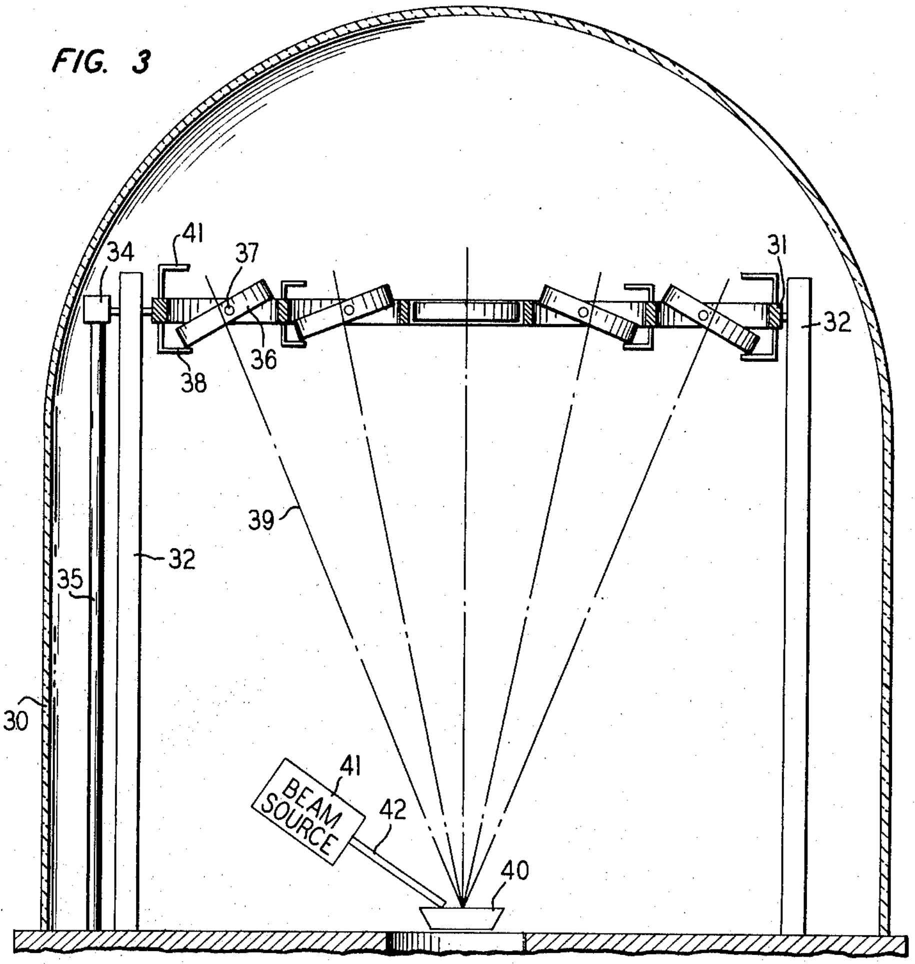
FIG. 3 is an elevational view in section of an exemplary vacuum vapor coating apparatus.

FIG. 3 shows portions of a vapor coating apparatus in which the space to be evacuated is surrounded by a bell jar 30. Within the bell jar 30, the main frame 31 is held by a support 32 such that it can be rotated about an axis 33 by means of the right angle drive 34 and drive shaft 35. The substrate holders 36 are mounted in the main frame 31 by pivots 37 which are slightly displaced (by approximately 0.01 inches, in exemplary constructed apparatus) in order to produce a state of unbalance in the substrate holder 36. The motion of the holder 36 is limited by stop 38 so as to come to rest perpendicular to a line 39 to the vapor source 40. Vapor sources such as evaporation sources and ion beam sputtering sources produce a vapor flux which is emanated along straight paths upward in all directions. The space inside the bell jar 30 is evacuated so that the mean free path of the vapor particles is greater than the distance to the substrates. Thus, the substrates, held as shown, are perpendicular to the flux of coating vapor. When the main frame 31 is rotated by 180° the substrate holders 36 freely pivot and come to rest against stops 41 in a similar position perpendicular to the vapor flux when it emanates from the vapor source 40. Even though the coatings thickness will vary somewhat from substrate to substrate away from the center of the main frame, the coating uniformity across each substrate is better than would obtain if the substrate holders were all fixed in the main frame. In addition, there is less shadowing of the substrate wafer by the pattern mask. Exemplary constructed apparatus was designed to coat 1.5 inch diameter wafers at a closest source to substrate distance of 10 inches.

Emanation of vapor from the vapor source 40 can be produced by a source of thermal energy, such as an electron beam 42 from a beam source 41. Such a coating process is referred to as evaporation coating. If the beam source 41 emits a beam 42 of ions, the coating process is referred to as ion beam sputtering.

Figure 4:
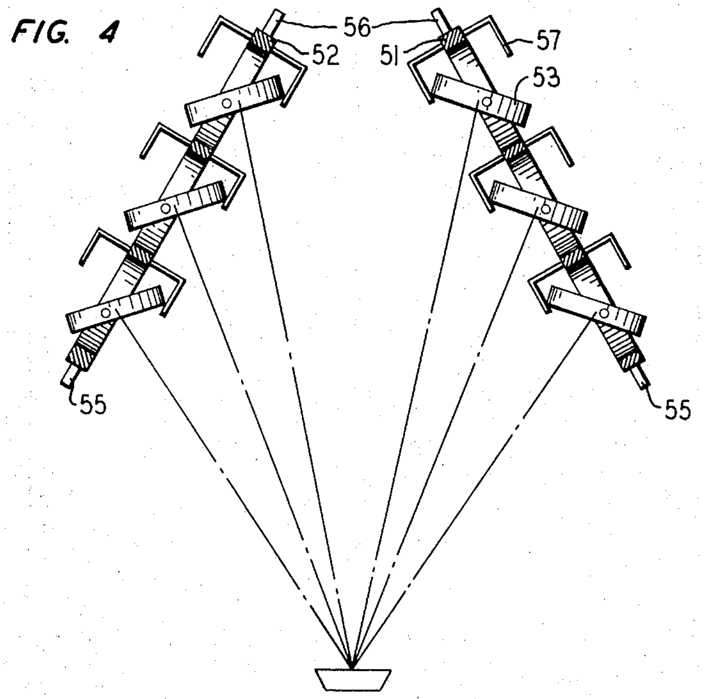
FIG. 4 is an elevational view in section of an exemplary workholder showing the position of the vapor source.

FIG. 4 shows another exemplary arrangement showing two main frames 51, 52 of several disposed within the vapor coating station. Such an arrangement can provide increased vapor coating capacity per run. In this apparatus the substrate holders 53 rest against stops 54 for the first side coating. After this coating is complete the main frames 51, 52 are rotated about axes 55, 56 and the substrate holders 53 come to rest against stops 57 in a position perpendicular to the vapor flux.

What is claimed is:

1. Apparatus for coating a plurality of workpieces, in which each workpiece is held in one of two angular positions relative to an incident vapor flux, each workpiece possessing at least a first planar surface and a second planar surface, which apparatus comprises:

a. a support member;
b. a main frame rotationally mounted to the support member;
c. means for rotating the main frame relative to the support member from a first orientation to a second orientation;
d. a first set of stopping members and a second set of stopping members affixed to the main frame;
e. a plurality of workpiece holders freely pivotally mounted to the main frame in an unbalanced state such that, when the main frame is in the first orientation each workpiece holder abutts at least one stopping member of the first set, and when the main frame is in the second orientation each workpiece holder abutts at least one stopping member of the second set;

wherein the relative positioning of the elements is selected such that, when the main frame is in the first orientation, each workpiece holder comes to rest with the first planar surface of its workpiece perpendicular to the incident vapor flux and when the main frame is in the second orientation, each workpiece holder comes to rest with the second planar surface of its workpiece perpendicular to the incident vapor flux; whereby rotation of the main frame serves to simultaneously reorient each of the workpieces.

2. Apparatus of claim 1 adapted for holding workpieces in which the first planar surface is parallel to the second planar surface.

3. Apparatus of claim 1 in which the unbalanced state of the workpiece holders is produced by displacing the pivot axis from the axis of symmetry of the workpiece holder.

4. Apparatus of claim 1 including at least one source of the incident flux.

5. Apparatus of claim 4 including means for thermally vaporizing source material.

6. Apparatus of claim 4 including means for ion beam sputtering source material.

7. Apparatus of claim 4 including means for evacuating the space between the source material and the workpiece holders.

8. Apparatus of claim 1 in which each workpiece holder includes at least one pattern mask.

* * * * *